United States Patent Office

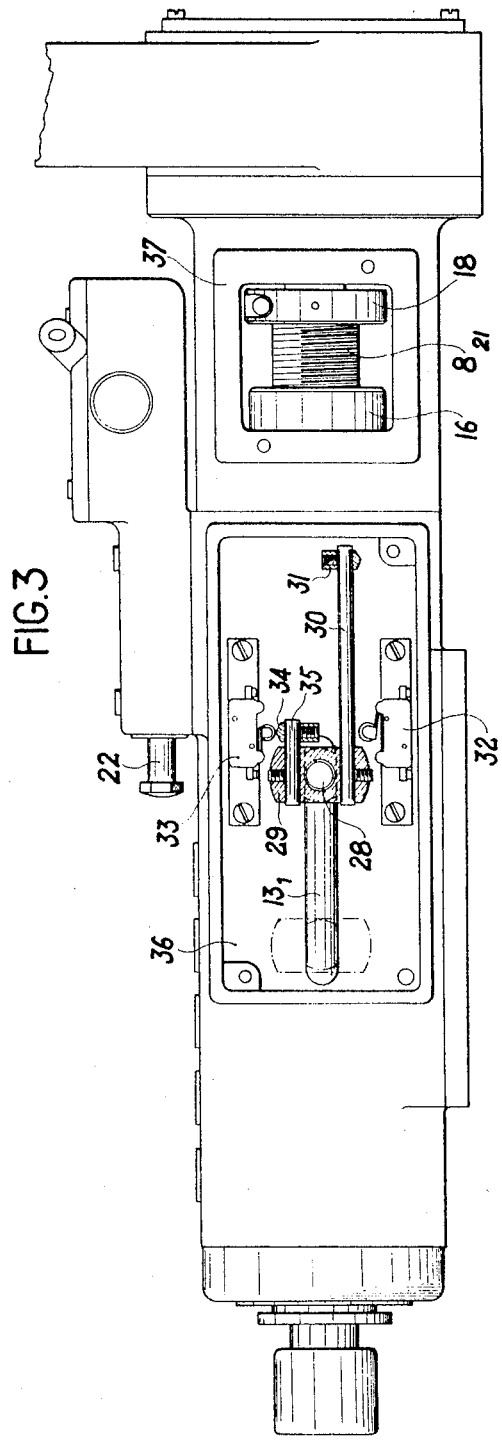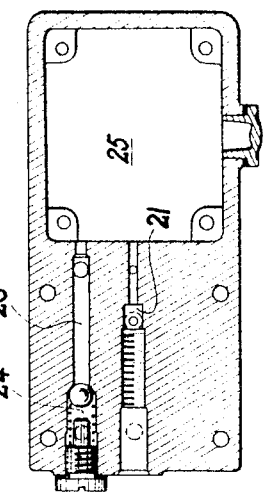

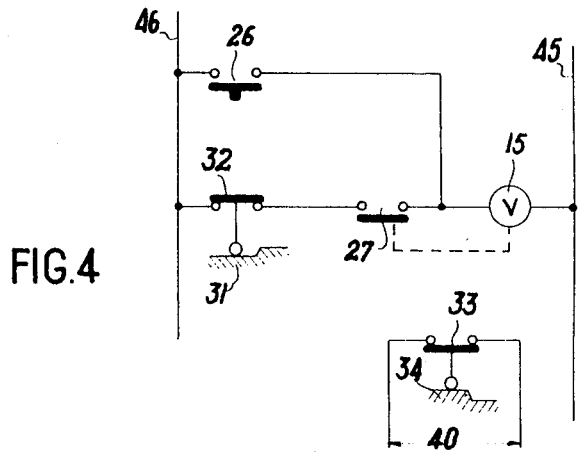
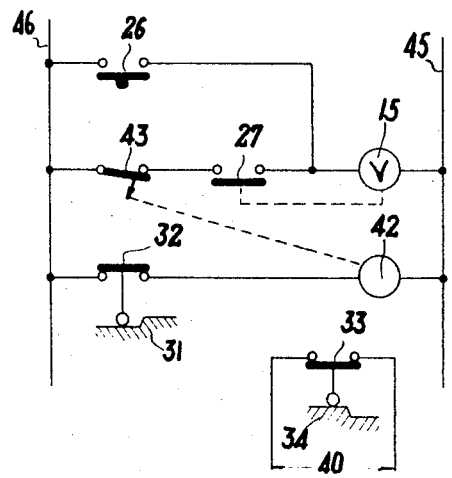
FIG.4
FIG.5
FIG.6

3,299,783
Patented Jan. 24, 1967

3,299,783
FLUID OPERATED MACHINE TOOL SPINDLE
Jack Louis Pierre Mazue, Bourgneuf-Val-d'Or, France, assignor to Societe d'Etude et de Construction de Machines-Outils, S.E.C.M.O., Saone and Loire, France, a company of France
Filed June 26, 1964, Ser. No. 378,360
Claims priority, application France, July 5, 1963, 940,479
11 Claims. (Cl. 91—355)

This invention relates to mechanism for controlling the movement of an axially displaceable spindle between a retracted and an advanced position.

In machine-tools it is frequently desired to actuate a tool-carrier spindle axially between a retracted idle position and a fully advanced active position in which the tool carried by the spindle is engaging a workpiece. It is further desirable in such cases that the spindle will be displaced on its forward stroke, i.e. from retracted to advanced position, in two stages, including a high-speed initial stage and a reduced-speed final stage. Thus in the case of a drilling head, with which this invention is especially though not exclusively concerned, it is desirable first to advance the drill bit carrier spindle axially at a rapid rate until the drill bit is engaging a surface of the work, and then at a slow rate while the bit is drilling into the work material down to a prescribed depth. In all cases it is advantageous that the spindle is returned to its idle retracted position at a uniformly rapid rate.

Objects of this invention include the provision of an improved arrangement for advancing an axially displaceable spindle from a retracted to an advanced position in two stages including a high-speed stage and a low-speed stage, wherein the length of each stage will be accurately and independently pre-settable, wherein the speed of advance during the low-speed stage will be accurately controllable over a wide range, wherein the return movement of the spindle will be effected at a rapid rate independent of the low-speed advance adjustment; to provide such an arrangement which will be simple, compact, robust, possess a high degree of symmetry of revolution about the axis of the spindle for optimum balancing of the forces involved in the operation thereof, will be easy to service and adjust, and will remain efficiently operative for a very great number of operating cycles.

Other objects and advantages will appear as the disclosure proceeds.

In brief, the arrangement of the invention comprises a first piston member connected for axial displacement with the spindle and slidable in a first cylinder chamber of a casing, and a second piston member connected for axial displacement relative to the first piston member and the spindle and slidable in a second cylinder chamber of the casing; pressure fluid means, preferably using compressed air, are connected with opposite ends of the first cylinder chamber for reciprocating the first piston member therein and thereby selectively displacing the spindle between its retracted and advanced positions; a speed-reducing fluid circuit, preferably using a hydraulic fluid i.e. liquid, is connected with opposite ends to the second cylinder chamber and includes an adjustable flow restrictor for controllably restricting the rate of displacement of the second piston member relative to the first member and spindle; and cooperating stops are provided on the first and second piston members for limiting the extent of relative displacement between them to an amount less than the total displacement of said first member and spindle relative to the casing. With this arrangement it will be clear that over part of the total displacement of the first member and spindle, as may be determined through adjustment of said stop means, the second member will be carried along in said displacement and will restrict the rate of displacement of the spindle, over said part of the total displacement thereof, to a value determined by said flow restrictor.

In a preferred embodiment of the invention, the rate-restricting fluid circuit includes a conduit by-passing the flow restrictor and having a one-way check valve so mounted therein as to permit substantially unrestricted fluid flow through the circuit when the second piston member is being displaced bodily with the first member and spindle towards the retracted position of the latter, whereby to effect a rapid return of the spindle to its retracted position.

The novel features of the invention will stand out from the ensuing description which relates to an exemplary embodiment selected by way of illustration but not of limitation and wherein the invention is applied to a drilling head. Reference will be had to the accompanying drawings wherein:

FIG. 2 is a partial view of the hydraulic speed-restricting attachment, in section on line b—b of FIG. 1;

FIG. 3 is an elevational view of the apparatus shown in FIG. 1 and from the same side as in that figure, with outer cover plates removed to show adjusting provisions according to the invention;

FIG. 4 is a simplified view of an electric control circuit usable with the apparatus of the preceding figures;

FIG. 5 shows a modified control circuit; and

FIG. 6 shows a further modification of the control circuit embodying a time delay device.

Figure 1:
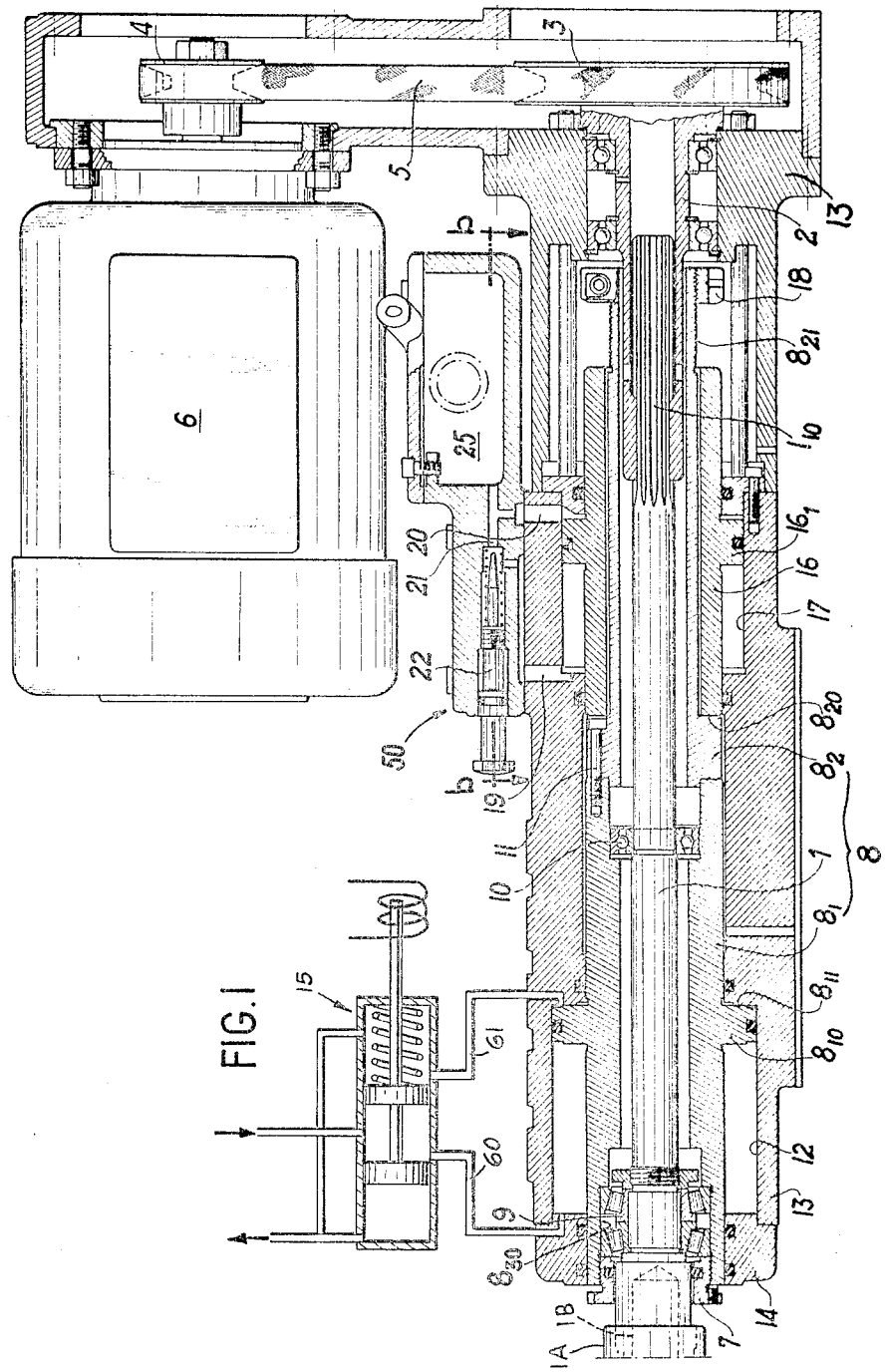
FIG. 1 is a view, mainly in vertical section, of an improved drilling machine head embodying the invention.

The improved drilling head assembly illustrated comprises a spindle 1 which carries at its one end, the left end as shown, a chuck 1A for a drilling bit not shown, but which fits within the chuck recess 1B and hence is aligned coaxially with the spindle 1. At its other end, the spindle 1 is formed with longitudinal splines $1_{10}$ engaged by complementary internal splines formed in a driver sleeve 2 journalled by way of ball bearings as shown in an elongated casing 13. The driver sleeve 2 carries at its outer end a V-pulley 3 connected by a drive belt 5 with a smaller pulley 4 mounted on the shaft of an electric motor 6 supported in any convenient position through means not shown.

A sleeve generally designated 8, which for convenience of assembly is shown as being made up of two parts $8_1$ and $8_2$ assembled in coaxial relation with screws such as 11, coaxially surrounds the spindle 1 and is connected for bodily axial displacement therewith and for rotation relative to the spindle. For this purpose the front (left) end of sleeve part $8_1$ is formed with an enlarged recess $8_{30}$ in which are mounted the outer races of a pair of roller bearings 9, which are retained in position by means of an externally threaded ring 7 screwed into a threaded outer end of said recess $8_{30}$. The inner races of bearings 9 are force-fitted around an enlarged-diameter section of spindle 1 in axially abutting relation with the ends of said section as shown. An additional bearing 10 is shown supporting an intermediate section of spindle 1 in the sleeve part $8_1$ in an enlarged rear end part of the latter.

The sleeve part $8_1$ is provided approximately at mid-length with a circumferential collar $8_{10}$ secured to, or as shown formed integral with part $8_1$, and serving as a piston. The piston $8_{10}$ is slidable within a cylinder chamber 12 defined in an enlarged forward end recess of casing 13 sealed by means of a cover 14 secured through means not shown. It will be understood that the cylinder chamber 12 is provided at its end with the usual fluid passages, 60 and 61, through which a pressure fluid, conveniently compressed air, can be selectively admitted into and exhausted from either end of said chamber by means of a suitable distributor valve, such as the electrically operated valve 15 described in further detail hereinafter with reference to FIGS. 4 to 6. There is thus provided a first double-acting fluid-actuator whereby sleeve 8 and with it the revolving spindle 1, can be selectively reciprocated axially between a forwardly advanced or extended, and a retracted position.

Another sleeve 16 coaxially and slidably surrounds sleeve 8 specifically the rear part $8_2$ thereof, and is formed with a peripheral piston portion $16_1$ midway of its length. This further piston $16_1$ is slidable in a further cylinder chamber 17 formed near the rear end of casing 13. The first piston sleeve 8 is provided with opposite abutment means for limiting the axial displacement of the second piston sleeve 16 relative to said first sleeve 8. Said abutments include an enlarged shoulder $8_{20}$ formed at the forward end of sleeve part $8_2$, engageable with the forward end surface of sleeve 16, and a stop nut 18 adjustably screwed on a thread $8_{21}$ at the rear end of part $8_2$ and engageable with the rear end surface of sleeve 16.

The opposite ends of chamber 17 connect with the inner ends of transverse passages 19 and 20 formed through a wall section of casing 13. The upper ends of passages connect with spaced points of a passage 21 formed in a hydraulic fluid attachment 50 secured to the top of casing 13. This attachment 50, shown separately in plan section in FIG. 2, includes a tank 25 for a hydraulic liquid such as oil and the aforementioned conduit 21 opens at one end into the bottom of this tank. An adjustable throttling valve 22 mounted in a side of the body of said attachment has a needle shank projecting into conduit 21 to an adjustable point between the passages 19 and 20 and serves to introduce a variable flow restriction into the hydraulic circuit thus provided. Further, as shown in FIG. 2, there is provided in parallel with conduit 21 a by-pass passage 23 which connects passages 19 and 20 directly with each other and with tank 25, and a ball check valve 24 is interposed in the by-pass passage 23 so as to permit liquid flow through passage 23 from passage 20 to passage 19 but not in the reverse direction.

The arrangement as so far described operates as follows. With the parts initially positioned as in FIG. 1, when it is desired to advance the drill-bit carrier spindle 1 to its working position, compressed air is discharged into the right-hand end of actuator cylinder chamber 12 through means to be later described. This air acts on the rear surface $8_{11}$ of piston $8_{10}$ to displace sleeve 8 and with it spindle 1 rapidly forward or leftward as here shown. After an initial rapid displacement the amount of which is determined by the adjustment of stop nut 18, this stop nut strikes the rear end face of sleeve 16, thereby terminating the initial rapid-advance stage of spindle movement. In one practical embodiment the stop nut 18 was adjustable on screw thread $8_{21}$ so as to vary the length of this initial stage over a range from 0 to 30 millimeters.

So soon as stop nut 18 has engaged the end face of piston 16, the rate of forward advance of the spindle 1 is substantially reduced, since it must now carry the outer sleeve 16 forward with it, and the piston $16_1$ must propel the hydraulic liquid around the circuit extending from the left side of said piston up through passage 19, rightward through conduit 21 and past the adjustable restrictor or throttle valve 22 and down through passage 20 to the opposite, right side of piston $16_1$. The rate of advance of the spindle in this second, slow stage of displacement is controllable over a wide range through action on the adjustable restrictor valve 22 as will be easily understood.

An electric control system for controlling the supply and exhaust of compressed air into and from the respective ends of chamber 12 will now be described with especial reference to FIG. 4.

As shown in FIG. 4, the electrically actuated valve 15 earlier referred to may be assumed to include in a conventional manner a solenoid (not shown) connectable on one side with a first D.-C. supply line 45 and on the other side with an opposite-polarity supply line 46 by way of a momentarily-depressible switch 26. The switch 26 is shunted by a circuit branch including a normally-open hold switch 27 operated from the solenoid in valve 15 so as to be closed on energization of said solenoid, and a normally closed microswitch 32 later described. It will be assumed that in the deenergized condition of the solenoid in valve 15 said valve is in the position of FIGURE 1 in which it supplies air to the left end of actuator chamber 12 through passage 60, and connects the right end of the chamber to exhaust through passage 61, while energization of the solenoid actuates the valve to a reverse position in which it supplies air under pressure to the right end of chamber 12 and connects the left end of the chamber with exhaust.

In the initial position of the parts illustrated in FIGS. 1-4, momentary depression of switch 26 applies a voltage pulse through the valve solenoid, and this closes the holding switch 27 so that the solenoid remains energized after switch 26 has been released (switch 32 is at this time closed). Energization of the valve solenoid moves valve 15 to its reverse aforementioned position in which it supplies pressure air to the right-hand end of actuator chamber 12, causing the spindle 1 to perform its two-stage forward displacement first at high then at low speed as earlier described.

Referring to FIG. 3, it will be seen that the sleeve 8 has a pin 28 projecting laterally from it through an elongated slot $13_1$ formed in a wall of casing 13. The outer end of pin 28 has a collar 29 secured to it, and a rod 30 is mounted in said collar, as by way of the set screw shown, so as to extend parallel to the direction of spindle 1. The rearwardly directed end of rod 30 carries a spring-pressed contact actuator element 31. Supported on the outer side of casing 13 in a position to be engageable by actuator element 31 is the microswitch 32 previously referred to with reference to FIG. 4. As will be readily understood, the position of rod 30 can be suitably adjusted in collar 29 so that at a predetermined point during the slow, second stage of advance of the spindle 1 and sleeve 8 as earlier described, the actuator element 31, engages the normally closed microswitch 32 and cams it to its open condition. This, as will be apparent from FIG. 4, immediately deenergizes the solenoid in valve 15 and the valve returns to its initial position in which it connects the left end of chamber 12 with the source of compressed air and the right end of the chamber with exhaust. The movement of the movable assembly is thus immediately reversed, and the spindle 1 and sleeve 8 start moving in the receding, or rightward, direction. During an initial stage of this receding movement the outer piston 16 is left behind in its advanced position. During a final stage which commences as soon as the right-hand shoulder surface $8_{20}$ of sleeve part $8_2$ engages the left-hand surface of piston $16_1$, the sleeve 16 is carried along in the receding movement with sleeve 8 and spindle 1.

In accordance with an important feature of the system disclosed, during this second stage of the receding movement, the hydraulic liquid is able to flow freely from the right to the left side of the piston $16_1$ without having to pass through the flow-restrictor 22. This is possible owing to the provision of the by-pass passage 23 and check-valve 24 therein, which permits leftward flow through said passage past the flow-restrictor 22 while preventing rightward flow as would otherwise tend to occur in the second stage of the advancing movement. Thus, there is substantially non slowing-down of the return movement of the spindle in its last phase and the desired quick return of the tool to its initial position is accomplished.

Preferably means are provided for warning the operator of the time when both sleeve members 8 and 16 have returned to their initial positions. As shown in FIG. 3, for this purpose the collar 29 movable with sleeve 8 has a second rod 35 adjustably mounted in it which is similar and parallel to, but shorter than the rod 30 and carries a spring-pressed contact-actuator element 34 at its rear end. Element 34 is engageable at a predetermined end position of the return stroke of sleeve 8 with a normally open microswitch 33 mounted at a suitable position on the casing 13, closing this switch. Closure of microswitch 33 serves, as schematically indicated in FIG. 4, to complete a warning circuit generally designated 40 for energizing any desired audible and/or visual signal means not shown. Rod 35 can be adjusted in collar 29 so as to actuate switch 33 when both sleeves 8 and 16 have returned to their initial positions shown in FIG. 1.

Preferably, as shown in FIG. 3, the switches 32 and 33 and associated actuating means including rods 30 and 35 and actuator elements carried by them, are positioned in a recess 36 provided on a side of casing 13 and adapted to be covered by means of a readily removable cover plate not shown. Further, an aperture 37 formed through the wall of casing 13 near its rear end and sealable with a cover not shown provides access to the adjustable stop nut 18. After removing both said covers the operator can very easily adjust the length of the fast initial advance displacement of the spindle by acting on stop nut 18 as earlier described, and he can adjust the length of the slow final advance displacement stage by positioning the rod 30 relative to collar 29 also as described. In the practical embodiment previously referred to, in which the initial fast spindle displacement was adjustable to a maximum of 30 mm., the length of the final slow displacement was adjustable up to a maximum value of 50 mm.

In the modified control circuit shown in FIG. 5, the starting switch 26 is shown as being operated automatically by means of a cam 38 which may form part of automatic control mechanism of generally conventional character, not shown, associated with the machine-tool to which the invention is applied. The circuit is further shown as including a manual switch 39 in parallel with start switch 26 and which is normally open, the switch 39 providing an alternative starting control operable independently of the said automatic control mechanism. There is further shown an independent stop-and-reversing switch 41 connected in series with the normal stop-reverse switch 32 earlier described and hold contacts 27; switch 41 is normally closed and provides an alternative control for retracting the spindle, e.g. for emergency use.

The further modified control circuit shown in FIG. 6 is provided for use in cases where it is desired to cause the spindle 1 to dwell a prescribed period of time in its advanced position, as for performing a rectifying or boring action with the drill bit carried by the spindle. There is here provided a delayed-opening relay 42 which has one end connected to D.-C. supply line 45, and the stop-reverse microswitch 32 is in this case connected between the other end of relay 42 and the other D.-C. supply line 46. The relay switch contacts 43 controlled by delay relay 42 are connected in series with the hold contacts 27 of solenoid valve 15, in place of the microswitch 32 of the embodiments previously described.

In the operation of this control circuit, it may be assumed that delay relay 42 is energized in the initial position of the assembly shown in FIG. 1, and its relay contacts 43 are then in closed condition. Hence the advance of the spindle 1 can be initiated through momentary closure of the push-button switch 26 as described for the control circuit of FIG. 4. The axial position of rod 30 (FIG. 3) may be adjusted so that its actuator element 31 will open microswitch 32 substantially on termination of the fast initial advance stage of the spindle assembly. The opening of microswitch 32 deenergizes time relay 42, without having any immediate effect on the movement of the spindle assembly. The spindle continues to advance until it reaches a fully advanced position, as determined e.g. by abutment of the foremost surface of piston $8_{10}$ against the inner surface of plug member 14, or abutment of other suitable stop means not shown. A prescribed, adjustable time after the deenergization of time relay 42, as determined by adjusting the time constant of said relay through conventional means not shown, the relay switch 43 opens, deenergizing solenoid valve 15 and initiating the rapid return of the spindle assembly to retracted position as earlier described.

It will be apparent from the foregoing disclosure that the invention has provided an improved arrangement for controlling the advance and retracting movements of an axially displaceable machine-tool spindle, in which the advance displacement is effected in two stages, a rapid initial or positioning stage, and a slow, e.g. working stage. The lengths of the respective stages as well as the reduced speed of advance during the second stage, are independently adjustable in a simple and efficient manner. The retracting movement is uniformly performed at high speed as is desirable for the rapid return of the tool to initial position. As will be evident from a consideration of FIG. 1, the entire assembly is compact and simple and its principal components including spindle 1, inner piston assembly 8 and outer piston assembly 16 are arranged in coaxial relationship whereby excellent balancing about the spindle axis is obtained and all mechanical forces, including both the actuating or motor forces and the retarding or resistant forces, involved in the operation of the assembly, are applied along the said axis.

The hydraulic speed-reducing attachment generally designated 50 requires a minimum of maintenance and servicing to ensure an effective and readily adjustable speed reduction over a great number of operating cycles. It is noted in this connection that the reservoir 25 serves essentially to provide a gravity head of hydraulic liquid in all positions of the drilling head assembly shown, which may be arranged for angular positional adjustment over a wide range between the horizontal position shown and vertical. Moreover, make-up liquid can be added from time to time into the reservoir 25 to compensate for losses through leakage, evaporation, and oxidation.

While the assembly shown in FIGS. 1–3 is easily dismantled and re-assembled when required and accessible for rapid adjustment, in normal operation all of its moving parts including the outer piston assembly 16 are at all times fully protected against the entry of dirt and against mechanical damage.

The electrical control circuits described are simple and efficient and provide for flexible operation in a great variety of applications, including automatically and/or remotely controlled systems.

It will be understood that various embodiments and modifications of the mechanical, hydraulic, pneumatic and electrical sections of the apparatus here disclosed may be conceived by those familiar with the arts involved without exceeding the scope of the invention.

What is claimed is:

1. In a machine-tool, an arrangement comprising in combination a casing; an axially elongated spindle; means rotatably mounting said spindle within said casing to permit said spindle to rotate about its axis of elongation; said spindle including means at one end thereof for attaching a rotatable tool coaxially with said spindle axis of elongation; said spindle being axially displaceable relative to the casing between a retracted and an advanced position; a first cylinder chamber in the casing; a first piston member coaxial with and connected for axial displacement with the spindle and displaceable in the first chamber; pressure fluid means associated with said first chamber including valve means selectively operable for admitting pressure fluid into either end of said first chamber to reciprocate said first piston member therein; a second cylinder chamber in the casing; a second piston member coaxial with and axially displaceable relative to said first piston member and spindle and displaceable in said second chamber; a speed-restricting fluid circuit connected with opposite ends of said second chamber and flow-restricting means in said circuit; and cooperating stop means on said first and second piston members for limiting the extent of relative displacement therebetween to an amount less than the total displacement of said first member and spindle relative to the casing, whereby said second member will be axially displaced bodily with the first member and spindle over part of said total displacement thereof and will restrict the speed of displacement of said first member and spindle over said part, to a valve determined by said flow restricting means.

2. An arrangement according to claim 1, wherein said fluid circuit includes a passage interconnecting said ends of the second chamber, in by-pass relation with said flow-restricting means, and a one-way check valve in said passage so mounted as to permit substantially unrestricted fluid flow through the circuit when the second piston member is being axially displaced bodily with the first member during displacement of said first member and spindle towards said retracted position, whereby to effect a rapid retraction of the spindle.

3. The arrangement defined in claim 1, wherein said pressure fluid is compressed air.

4. The arrangement defined in claim 1, wherein said speed restricting fluid is a liquid.

5. The arrangement defined in claim 4, wherein said fluid circuit comprises an attachment secured to the casing and including a reservoir for said liquid, a conduit connected to the reservoir and having connections leading to the opposite ends of said second chamber, and an adjustable flow restrictor controlling the effective flow section area through said conduit between said connections.

6. The arrangement defined in claim 1, wherein said valve means comprises an electrically operated valve, an electric circuit for operating said valve, a starting switch connected in said operating circuit and actuatable to move the valve to a position in which it will admit said pressure fluid to a rear end of said first chamber, a stop-and-reverse switch connected in said operating circuit and actuatable to move the valve to a position in which it will admit said pressure fluid to the front end of said first chamber, and actuator means carried by said first piston member and engageable with said stop-and-reverse switch for actuating the latter at an adjustable point during spindle displacement towards advanced position.

7. The arrangement defined in claim 6, including a time relay connected in said valve operating circuit so as to be actuated by said stop-and-reverse switch and operative to move the valve to said second mentioned position a predeterminable time after actuation of said time relay.

8. In a machine-tool, the combination comprising a casing; a spindle rotatable in the casing and axially displaceable relative thereto between a retracted and an advanced position; said spindle including means at one end thereof for attaching a tool in coaxial alignment with said spindle axis whereupon said tool is rotatable and displaceable in unison with said spindle; a first cylinder chamber in the casing; a sleeve member coaxially surrounding the spindle and arranged for axial displacement but not for rotation bodily therewith; a first piston carried peripherally of the sleeve member and displaceable in said first chamber; pressure fluid means associated with said first chamber including valve means selectively operable for admitting pressure fluid into either end of said first chamber to reciprocate said first piston therein; a second cylinder chamber in the casing; a second piston member coaxially surrounding and axially displaceable relative to said sleeve member, and displaceable in said second chamber; a speed-restricting fluid circuit connected with opposite ends of said second chamber and flow-restricting means in said circuit; and cooperating stop means on said sleeve member and said second piston member respectively for limiting the extent of relative displacement therebetween to an amount less than the total displacement of said sleeve member and spindle relative to the casing, whereby said second piston member will be axially displaced bodily with the sleeve member and spindle over a part of said total displacement thereof and will restrict the speed of displacement of said sleeve member and spindle over said part of the displacement to a value determined by said flow restricting means.

9. The arrangement defined in claim 8, wherein said fluid circuit includes a passage interconnecting said ends of the second chamber in by-pass relation with said flow-restricting means, and a one-way valve in said passage mounted to permit substantially unrestricted fluid flow through the circuit when the second piston member is being axially displaced bodily with the sleeve member during displacement of the sleeve member and spindle towards retracted position whereby to effect rapid retraction of the spindle.

10. The arrangement defined in claim 8, wherein the second piston member comprises a second sleeve member coaxially surrounding a portion of the first-mentioned sleeve member and a second piston carried peripherally of said second sleeve member.

11. The arrangement defined in claim 10, wherein the stop means on the first-mentioned sleeve member includes a stop nut threadedly adjustable on that end of the sleeve member which is rearmost during spindle displacement towards advanced position.

References Cited by the Examiner
UNITED STATES PATENTS

| | | | |
|---|---|---|---|
| 2,084,562 | 6/1937 | Schafer | 91—355 |
| 2,605,751 | 8/1952 | Perry et al. | 91—355 |
| 2,648,238 | 8/1953 | Raney | 91—355 |
| 2,692,660 | 10/1954 | Good et al. | 91—355 |
| 2,930,261 | 3/1960 | Emrick | 77—33.5 |
| 2,991,760 | 7/1961 | Rhine | 91—355 |

FOREIGN PATENTS

| | | |
|---|---|---|
| 1,274,991 | 9/1961 | France. |

MARTIN P. SCHWADRON, *Primary Examiner.*

PAUL E. MASLOUSKY, *Examiner.*